(12) United States Patent
Kaneko et al.

(10) Patent No.: US 7,858,007 B2
(45) Date of Patent: Dec. 28, 2010

(54) HONEYCOMB FORMING DIE AND JIG FOR HONEYCOMB FORMING DIE USING THE SAME

(75) Inventors: Takahisa Kaneko, Nagoya (JP); Masayuki Nate, Nagoya (JP); Masayuki Hironaga, Nagoya (JP); Yuji Deguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 287 days.

(21) Appl. No.: 12/000,764

(22) Filed: Dec. 17, 2007

(65) Prior Publication Data
US 2008/0113858 A1    May 15, 2008

Related U.S. Application Data

(63) Continuation of application No. 10/507,505, filed as application No. PCT/JP03/01030 on Jan. 31, 2003, now abandoned.

(30) Foreign Application Priority Data
Mar. 28, 2002    (JP) .............................. 2002-091026

(51) Int. Cl.
*B29C 47/00* (2006.01)
*B29C 47/12* (2006.01)

(52) U.S. Cl. .......................... 264/177.12; 264/177.11; 264/211.11; 425/380; 425/464; 425/466; 425/467

(58) Field of Classification Search .................... None
See application file for complete search history.

(56) References Cited

U.S. PATENT DOCUMENTS

| | | | |
|---|---|---|---|
| 1,973,428 | A | 9/1934 | Comstock |
| 3,790,654 | A | 2/1974 | Bagley |
| 3,905,743 | A | 9/1975 | Bagley |
| 4,278,412 | A | 7/1981 | Ozaki et al. |
| 4,465,652 | A | 8/1984 | Lentz |
| 4,687,433 | A * | 8/1987 | Ozaki et al. ................. 425/464 |
| 4,834,640 | A | 5/1989 | Inoue et al. |
| 4,839,214 | A * | 6/1989 | Oda et al. ..................... 428/116 |
| 5,219,509 | A | 6/1993 | Cocchetto et al. |
| 5,286,323 | A | 2/1994 | Bagley |
| 5,308,556 | A | 5/1994 | Bagley |
| 5,308,568 | A | 5/1994 | Lipp |
| 5,702,659 | A | 12/1997 | Kragle et al. |
| 5,855,781 | A * | 1/1999 | Yorita et al. ........... 210/321.82 |
| 6,193,497 | B1 | 2/2001 | Suzuki |
| 6,302,679 | B1 | 10/2001 | Seely |

FOREIGN PATENT DOCUMENTS

| | | |
|---|---|---|
| JP | A 7-246610 | 9/1995 |
| JP | A 2000-326318 | 11/2000 |

* cited by examiner

*Primary Examiner*—Jeffrey Wollschlager
(74) *Attorney, Agent, or Firm*—Oliff & Berridge, PLC

(57) ABSTRACT

A die was provided for forming a honeycomb body having a structure provided with groovy slits on a front face thereof, the slits being formed by cell blocks and back holes on a back surface thereof, each hole being communicatively connected with the slit. The die is made of cemented carbide having wear resistance. The cemented carbide is formed by compacting, followed by sintering at high temperature, metal carbide powder of transition metal element series with an iron group metal binder having toughness. A connection area ratio of the back hole and the cell block is 35 to 65%.

2 Claims, 3 Drawing Sheets

… …

HONEYCOMB FORMING DIE AND JIG FOR HONEYCOMB FORMING DIE USING THE SAME

This is Continuation of application Ser. No. 10/507,505, filed Sep. 13, 2004, which is a National Stage of PCT/JP03/01030, filed Jan. 31, 2003.

TECHNICAL FIELD

The present invention relates to a die for forming a honeycomb body and a jig for forming a honeycomb body using the die.

BACKGROUND ART

A honeycomb structure has been used in a filter for trapping particulate matter in exhaust gas from an internal combustion engine, boiler, and the like, particularly diesel particulate matter.

Heretofore, as a die for extruding a ceramic honeycomb body, there has been known the die (10) for extruding a honeycomb body, which is provided with groovy slits on the front face of a base metal made of stainless steel and iron, the groovy slits being formed by cell blocks, and provided with back holes, on a back face thereof, each communicatively connected with the slit.

In the die for forming a honeycomb body arranged as described above, after, for example, a nickel plated layer is formed on a front face of a cell block body, a surface treatment is conducted to form a CVD or PVD layer, which is composed of at least one or two materials selected from a group composed of TiC, TiN, and TiCN on a front face of the nickel plated layer, or to form a composite plated layer, in which hard powder such as SiC, diamond, CBN, and the like is dispersed in a nickel plated film, on the front face of the nickel plated layer in order to adjust a slit width of the respective cell blocks as well as to enhance durability of the die.

However, when a honeycomb structure containing SiC and the like is manufactured using the die, the die is greatly worn by a passing resistance which is caused when SiC contained in a raw material flows in the die. Accordingly, when kneaded clay is extruded in an amount of about 50 m, not only wear proceeds up to a base metal but also a configuration of an extruded honeycomb structure is made unstable, from which a problem arises in that a non-defective product ratio is greatly lowered.

The present invention is made in view of the above described problems heretofore, and aims to provide a die for forming a honeycomb body and a die jig for forming a honeycomb body using the same which can enhance wear resistance of the die or the die jig when a raw material containing a material having very high hardness such as SiC and the like is extruded as well as can overcome a configurational disadvantage of an extruded body due to wear of the die.

DISCLOSURE OF THE INVENTION

According to the present invention, there is provided a die for forming a honeycomb body, the die comprising a structure provided with groovy slits on a front face thereof, the slits being formed by cell blocks, and provided with back holes on a back face thereof, each hole being communicatively connected with the slit, characterized in that the die is made of cemented carbide having wear resistance, the cemented carbide being formed by compacting, followed by sintering at high temperature, metal carbide powder of transition metal element series with a iron group metal binder having toughness, a connection area ratio of the back hole and the cell block being 35 to 65%. In this case, a height of the cell blocks is preferably 2 to 5 mm.

Also, according to the present invention, there is provided a jig for forming a honeycomb body, the jig comprising a die having a structure provided with groovy slits on a front face thereof, the slits being formed by cell blocks, and provided with back holes on a back face thereof, each hole being communicatively connected with the slit; a holding plate fixing a profile and size of the honeycomb body; and a back holding plate controlling an amount of kneaded clay flowing into the back holes uniformly; characterized in that the die and the holding plate are made of cemented carbide having wear resistance.

In the present invention, it is preferable that a back holding plate is made of cemented carbide having high wear resistance.

Further, in the present invention, it is preferable that only the portions of a holding plate and the back holding plate are made of cemented carbide having high wear resistance, the portions being in contact with the kneaded clay.

In the present invention, it is preferable that the cemented carbide is formed by compacting, followed by sintering at high temperature, metal carbide powder of transition metal element series with an iron group metal binder having high toughness.

BEST MODE FOR CARRYING OUT THE INVENTION

Detailed description will be made below on embodiments of the present invention on the basis of the drawings.

Figure 1:
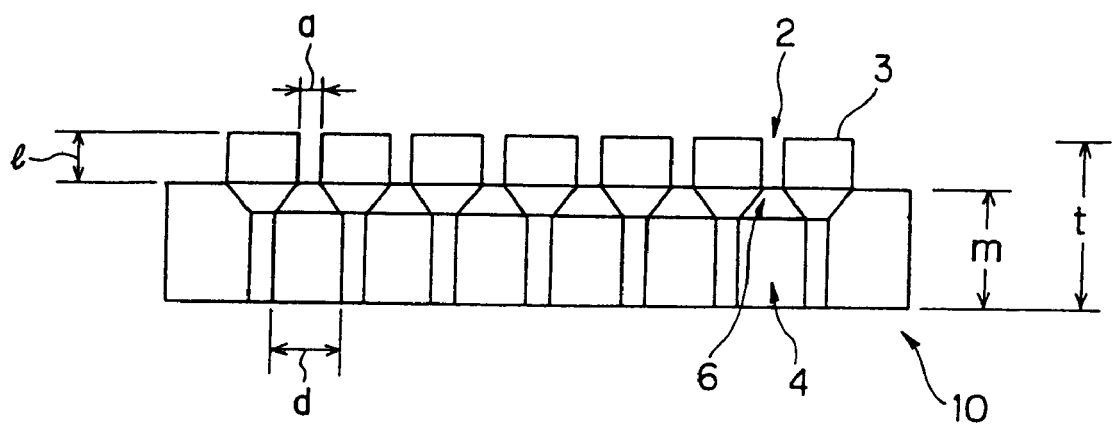
FIG. 1 is a schematic sectional view showing an example of a die for forming a honeycomb body.
Figure 2:
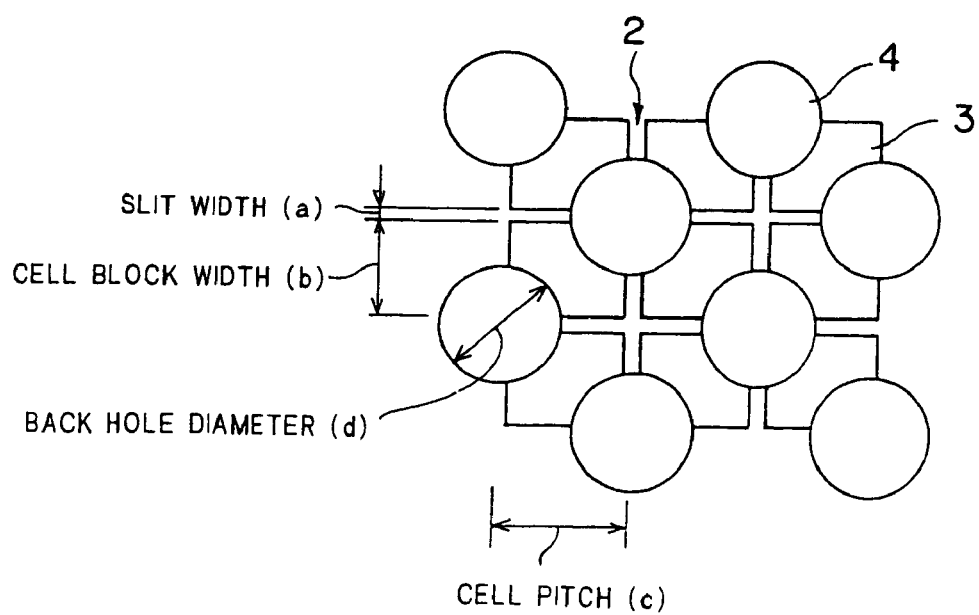
FIG. 2 is a view explaining a relation between cell blocks and back holes.

FIG. 1 is a schematic sectional view showing an example of a die for forming a honeycomb body, and FIG. 2 is a view explaining a relation between cell blocks and back holes FIG. 1.

Figure 3:
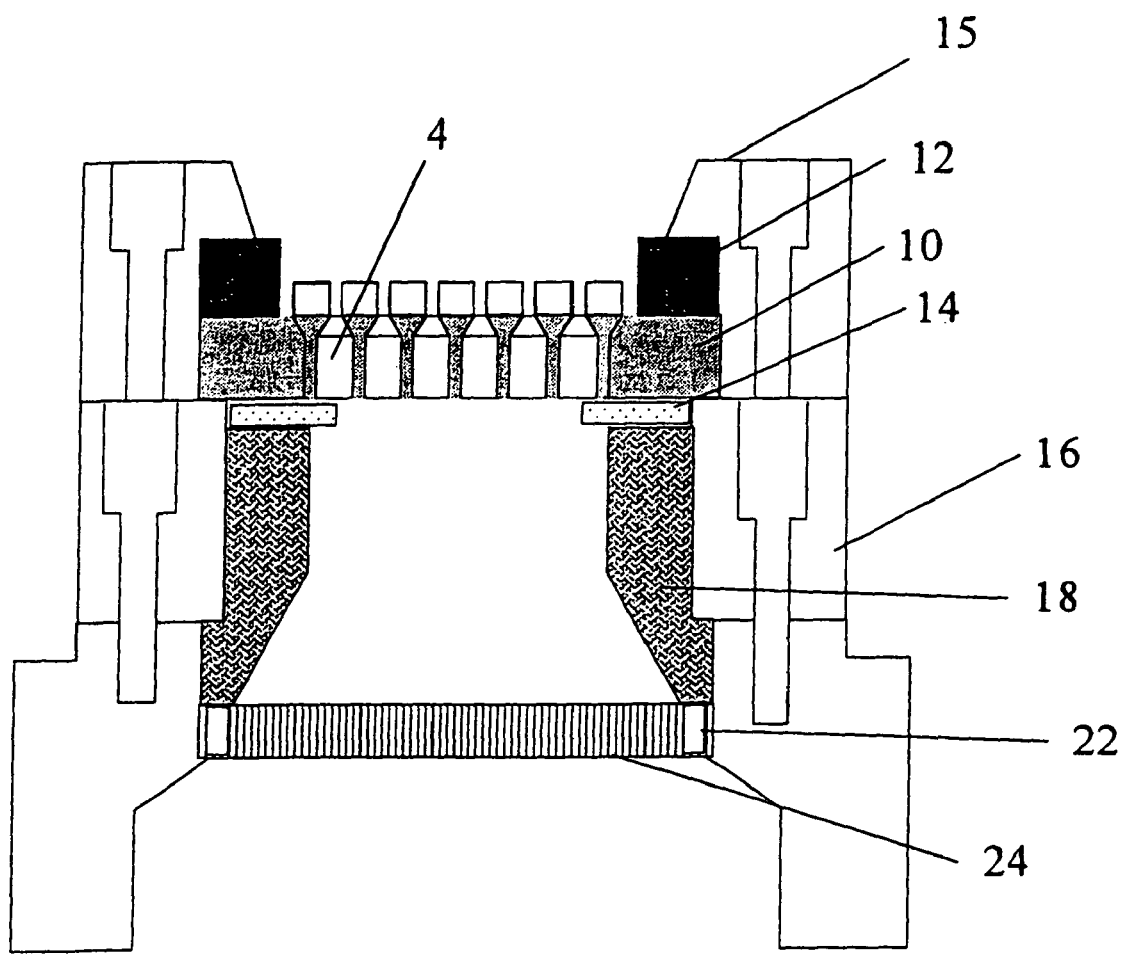
FIG. 3 is a configurational view showing an example of a jig for forming a honeycomb body.

For example, as shown in FIGS. 1 and 3, a die of the present invention is a die (10) for extruding a honeycomb body which has a structure provided with groovy slits (2) on a front face thereof, formed by cell blocks (3) having cell block width (b), and provided with back holes (4), on a back face thereof, each communicatively connected with the slit (2) via a necked portion (6).

The feature of the present invention is that the die itself is formed by cemented carbide having wear resistance.

With the above arrangement, even if a raw material containing a material having very high hardness such as SiC and the like is extruded, wear resistance (life) of the die can be enhanced as well as a configurational disadvantage of an extruded body (a formed body) due to wear of the die can be overcome.

However, the cemented carbide has such a property that it is brittle although it is excellent in heat resistance and wear resistance.

In the die of the present invention, a connection area ratio of a back hole 4 and a cell block 3 is preferably set to 35 to 65% (more preferably to 50±15% and further more preferably to 50±5%) and further a height (1) of a cell block 3 is preferably set to 2 to 5 mm to secure strength of the cell blocks without interfering the extrusion of the honeycomb structure for the purpose of preventing breakage of the cell blocks due to the brittleness of the cemented carbide.

Note that the connection area ratio of the back hole and the cell block is calculated by the following expression (refer to FIG. 2).

(connection area ratio of back hole and cell block)
=100×(cell block area−area of back hole portion relating to cell block)/(cell block area)

Next, the die jig using the die of the present invention will be explained with reference to FIG. 3. As shown in FIG. 3, the die jig of the present invention is a jig for forming a honeycomb body which includes a die 10 having a structure provided with groovy slits on a front face thereof, the slits being formed by cell blocks, and provided with back holes 4 on a back surface thereof, each hole being communicatively connected with the slit, a holding plate 12 fixing a profile and size of a honeycomb body, and a back holding plate 14 controlling an amount of kneaded clay uniformly flowing into the back holes 4. The die jig also includes a holding jig 15, a forming ring 18, a noodle die 22, a screen 24, and a forming ring holding element 16.

Figure 4:
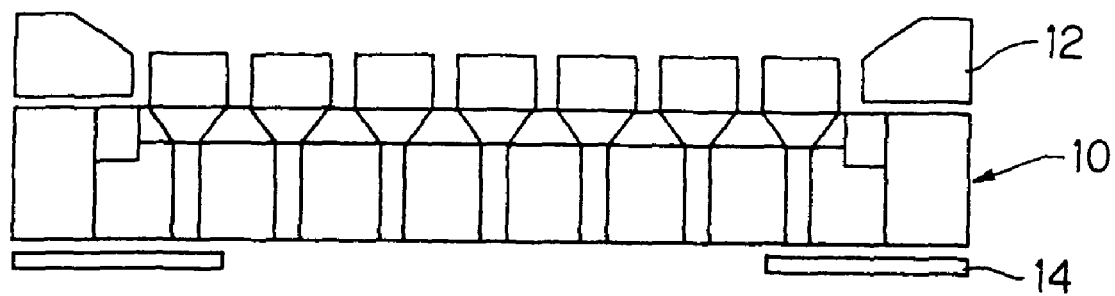
FIG. 4 is an enlarged sectional view of a main portion of FIG. 3.

In the die jig of the present invention, it is preferable that at least the die 10, the holding plate 12, and the back holding plate 14 are made of cemented carbide having wear resistance as shown in FIG. 4.

With the above arrangement, even if a raw material containing a material having very high hardness such as SiC and the like is extruded, wear resistance (life) of the die jig can be enhanced as well as a configurational disadvantage of an extruded body due to wear of the die jig can be overcome.

Further, it is more preferable that only the portions of the holding plate 12 and the back holding plate 14 be made of cemented carbide having wear resistance, the portions being in contact with kneaded clay, because brittleness of the portions can be reduced and they can be easily handled at work.

Although the cemented carbide used in the present invention is not particularly restricted, it is preferably formed by compacting, followed by sintering at high temperature, metal carbide powder of transition metal element series, for example, WC, TiC, TaC, etc. with an iron group metal binder having toughness such as Co, Ni, etc.

The present invention will further be described hereinafter in detail based on examples, but the present invention is not limited to these examples.

(Method of Manufacturing Cemented Carbide Die)

After WC—Co (composite body of tungsten carbide and cobalt) powder as cemented carbide was formed into a square plate of 100 mm on a side and 40 mm in thickness (100×100× 40 t) by press work and the like, it was tentatively sintered at 500 to 700° C. Thereafter, back holes having a predetermined diameter and a predetermined depth were drilled with a predetermined pitch from one end face of the square plate, and then the square plate was subjected to final sintering at 1000 to 1300° C., thereby it was contracted up to a square plate of 24 mm in width and 70 mm on a side (70×70×24 t). Thereafter, a predetermined dimension of the square plate was accurately obtained by polishing the entire surface thereof.

Next, a cemented carbide die was obtained by forming slits 2 of 310 μm in width (a) and 3.0 mm in depth (l) with a cell pitch (c) of 1.5 mm on the other face of the thus obtained square plate in a grid pattern at every other positions of the back holes (of 1.8 mm in diameter), which were previously formed on one face of the square plate, by wire cut electric-discharge machining, or creep feed grinding or plunge cut grinding with diamond abrasive grain (refer to FIGS. 1 to 2).

(Method of Manufacturing Surface-treated Stainless Steel Die)

A high strength stainless steel plate material was machined into a square plate of 70 mm on a side and 23 mm in thickness, by using a grinding machine.

Additionally, slits of 410 μm in width (a) and 3.0 mm in depth (1) were formed with a cell pitch (c) of 1.5 mm by wire cut electric discharge machining, or creep feed grinding or plunge cut grinding using grinder with CBN abrasive grain, in a grid pattern, on one end face of the square plate (see FIGS. 1 and 2).

Furthermore, back holes of 1.8 mm in diameter (d) and 3.0 mm in depth (m) were fabricated at the crossover positions of the slits (2) (at every other positions) with a pitch of 1.5 mm, from the other end face side of the square plate, by drilling to obtain a base metal made of stainless steel (see FIGS. 1 and 2).

Further, a surface-treated (coated) stainless steel die was obtained by subjecting a front face of the base metal to a plating treatment or a chemical vapor deposition (CVD) treatment.

(Extrusion of the Honeycomb Body)

The die for forming a honeycomb body was set to a die jig shown in FIG. 3, and a honeycomb structure was extruded using kneaded clay composed of a raw material of argillaceous Si—SiC.

Note that the kneaded clay was obtained by kneading a raw material made of metal silicon (Me—Si) and SiC which were prepared at a ratio of 25:75 and to which water, an organic binder, and a hole forming material were added.

EXAMPLE 1, COMPARATIVE EXAMPLES 1 AND 2

Honeycomb structures were extruded, respectively using a cemented carbide die shown in Table 1 (embodiment 1; a connection area ratio of back holes and cell blocks was 50% (refer to FIG. 2) and the cell blocks had the height (1) of 3 mm) and surface-treated stainless steel dies (comparative examples 1 to 2) shown in Table 1. The results are shown in Table 1.

TABLE 1

| | Type of die | | Wear resistance (*1) | Dispersion of configuration σ (*2) |
|---|---|---|---|---|
| | Base material | Surface treatment | | |
| Embodiment 1 | Cemented carbide (WC-Co) | Absent | 100< | 0.02 |
| Comparative example 1 | Stainless steel material (C-450) | Non electrolytic plating treatment thickness: 50 μm | 1 | 0.80 |
| Comparative example 2 | | CVD film thickness: 15 μm | 5 | 0.50 |

*1 Wear resistance: when wear resistance of the comparative example was set to 1.
*2 Dispersion of configuration: a standard deviation of 100 diagonal line cross points was calculated.

From the results of Table 1, wear resistance of the cemented carbide die (embodiment 1) is at least 100 times or more larger than that of the plated die (comparative example 1) as well as the wear resistance thereof is enhanced, thereby a change of configuration due to wear is greatly reduced.

EXAMPLES 2 TO 4, COMPARATIVE EXAMPLES 3 AND 4

Honeycomb bodies were extruded, respectively using cemented carbide dies (embodiments 2 to 4 and comparative example 3 to 4, in which cell blocks had a height (l) of 3 mm) in which a connection area ratio of cell blocks and back holes was set as shown in Table 2. The results are shown in Table 2.

TABLE 2

| | Connection area ratio of cell block - kneaded clay introduction hole (%) | Presence/ absence of broken cell block | Dispersion of configuration (σ) *2 | Extrusion of honeycomb structure |
|---|---|---|---|---|
| Embodiment 2 | 35 | Absent | 0.30 | ◯ |
| Embodiment 3 | 50 | Absent | 0.02 | ◯ |
| Embodiment 4 | 65 | Absent | 0.20 | ◯ |
| Comparative example 3 | 30 | Present | 0.50 | △ |
| Comparative example 4 | 70 | Present | — | X |

*2 Dispersion of configuration: a standard deviation of 100 diagonal line cross points was calculated.

From the results of Table 2, the honeycomb structures could be excellently extruded without breakage of the cell blocks in the dies in extrusion and with a less amount of change of configuration by setting the connection area ratio of the cell block and the back hole to 35 to 65% as shown in the embodiments 2 to 4.

Note that, in the comparative example 3, since the connection area ratio of the cell blocks and the back holes was less than 35%, the cell blocks were broken.

In contrast, in the comparative example 4, since the connection area ratio of the cell blocks and the back holes exceeded 65%, the diameter of the back holes was made excessively small. Accordingly, no honeycomb structure could be extruded because extrusion pressure was increased by an increase in the flow path resistance of the back hole portion communicating with the slits. Further, the die was broken because the strength thereof could not be maintained due to the increase in the extrusion pressure.

EXAMPLES 5 TO 7, COMPARATIVE EXAMPLES 5 AND 6

Honeycomb bodies were extruded, respectively using cemented carbide dies (embodiments 5 to 7 and comparative examples 5 to 6) made such that a connection area ratio of cell blocks and back holes was set to 50% (refer to Table 2) and that the cell blocks had a height (l) as shown in Table 3, respectively. The results are shown in Table 3.

TABLE 3

| | Height of cell block (mm) | Presence/ absence of broken cell block | Outside appearance of product (presence/ absence of crack) | Extrusion of honeycomb structure |
|---|---|---|---|---|
| Embodiment 5 | 2 | Absent | Absent | ◯ |
| Embodiment 6 | 3 | Absent | Absent | ◯ |
| Embodiment 7 | 5 | Absent | Absent | ◯ |
| Comparative example 5 | 1 | Absent | Present | X |
| Comparative example 6 | 7 | Present | Absent | X |

From the results of Table 3, extruded honeycomb structures and products molded after the honeycomb structures were extrude had an excellent outside appearance in the embodiments 5 to 7 because the cell blocks of the dies were not broken in extrusion by setting a height of the cell blocks to 2 to 5 mm.

Note that, in the comparative example 5, since the height of the cell blocks was set to less than 2 mm, no cell block was broken. However, no honeycomb structure could be obtained because the cells of a honeycomb structure were insufficiently bonded under pressure in extrusion. This is because there was no staying time during which kneaded clay was bonded under pressure.

In contrast, in the comparative example 6, cell blocks were broken because they had a height exceeding 5 mm. This is because a flow path resistance of a slit portion was increased as well as a load on a connected portion was increased.

EXAMPLE 8 AND COMPARATIVE EXAMPLE 7

Honeycomb structures were extruded, respectively using a die 10, a holding plate 12, and a back holding plate 14 composed of wear resistant cemented carbide (embodiment 8) and using a die 10, a holding plate 12, and a back holding plate 14 composed of a high strength stainless steel material (comparative example 7, however, the die of the example 1 was used as the die 10) among the die jigs shown in FIG. 4. The results are shown in Table 4.

TABLE 4

| | Material of jig for die | Wear resistance *1 | Dispersion of configuration (σ) *2 |
|---|---|---|---|
| Embodiment 8 | Cemented carbide (WC-Co) | 100< | 0.02 |
| Comparative example 7 | Stainless steel material (C-450) | 1 | 0.50 |

*1 Wear resistance: when wear resistance of the comparative example was set to 1.
*2 Dispersion of configuration: a standard deviation of 100 diagonal line cross points was calculated.

From the results of Table 4, it was confirmed that the embodiment 8 had not only a life at least 100 times or more longer than that of the comparative example 7 but also a stable accuracy of a configuration.

INDUSTRIAL APPLICABILITY

The die for forming a honeycomb body and the die jig for forming the honeycomb body using the same of the present invention can enhance wear resistance of the die or the die jig when the raw material containing the material having very high hardness such as SiC and the like is extruded as well as can overcome the defect in shape of the extruded body due to the wear of the die.

The invention claimed is:

1. A method for processing a raw material containing SiC into a kneaded clay using a die, comprising:

preparing a jig for forming a honeycomb structure whose main component is SiC;

said jig comprising:

an input port for a raw material containing SiC;

a die, wherein the die comprising a plate having a predetermined size and provided with a plurality of cell blocks defined by a plurality of groovy slits on a front face thereof, and a plurality of back holes on a back face thereof, each hole being communicatively connected with the slit and each cell block having a height of 2 to 5 mm;

a holding plate fixing a profile and size of the honeycomb body extruded from the die for forming the honeycomb body; and a back holding plate controlling an amount of kneaded clay flowing into the back holes uniformly;

wherein the die plate and only the portions which are in contact with the kneaded clay of the holding plate and the back holding plate are made of cemented carbide having wear resistance, the cemented carbide being formed by compacting, followed by sintering at high temperature, metal carbide powder of transition metal element series with an iron group metal binder having toughness and including any one of WC, TiC and TaC, a connection area ratio of the back hole and the cell block being 45 to 55% so as to prevent breakage when being used with the raw material containing SiC, the connection area ratio being 100×(cell block area−area of back hole portion relating to cell block)/(cell block area), inputting into the input port of the jig the raw material for extrusion into the kneaded clay; and extruding repeatedly for considerably long period of time the kneaded clay containing SiC as the main component from the raw material by using the die.

2. The method for processing a raw material containing SiC into a kneaded clay using a die according to claim 1, wherein the iron group metal binder is Co or Ni.

* * * * *